Patented Aug. 18, 1953

2,649,482

UNITED STATES PATENT OFFICE 2,649,482

METHOD FOR THE PREPARATION OF 4-CHLORO-2,5-DIALKOXYANILINES

Albert Bloom, Summit, N. J., assignor to General Aniline & Film Corporation, New York, N. Y., a corporation of Delaware No Drawing. Application December 15, 1950,
Serial No. 201,057

9 Claims. (Cl. 260—562)

The present invention relates to a method for the preparation of 4-chloro-2,5-dialkoxyanilines.

4-chloro-2,5-dialkoxyanilines are valuable intermediates in the manufacture of dyestuffs.

A number of processes have been worked out for the manufacture of such intermediates. One such method is described in United States Letters Patent 1,919,580 granted July 25, 1933, in which 2,5 - dialkoxy-4-nitroanilines (German Patents 141,975 and 141,398) are diazotized and converted to 1-chloro-4-nitro-2,5-dialkoxybenzenes by the Sandmeyer reaction. The products so obtained are then reduced to the corresponding amino derivative.

Another process involves the chlorination of the dialkyl ether of hydroquinone, to yield 2-chloro-hydroquinone-dialkyl ether. The product is purified by fractionation, and then nitrated to 4-chloro-1-nitro-2,5-dialkoxybenzene. This product is then reduced to the corresponding amine, and purified to yield the desired 4-chloro-2,5-dialkoxyaniline.

It is evident that in these procedures a nitro derivative is either employed as the parent material or is produced in one phase of the process, the nitro group being reduced to eventually yield the amino group of the end product. Neither procedures outlined above is satisfactory from the standpoint of purity of the product and the yields obtained.

I have now discovered a very economical, efficient and simple process for the manufacture of 4-chloro-2,5-dialkoxyanilines, while starting from 2,5-dialkoxyanilines, thereby avoiding the reduction step of the previous procedures. The 2,5-dialkoxyaniline is acylated, and, without isolation, chlorinated to give 2,5-dialkoxy-4-chloroacylanilide. The resulting product is then isolated and hydrolyzed to the free amino compound.

The preparation of 4-chloro-2,5-dialkoxyanilines, while starting from 2,5-dialkoxyanilines and proceeding as above, constitutes the purposes and objects of the present invention.

The 2,5-dialkoxyanilines which I use as parent materials are those in which the alkoxy group contains up to 4 carbon atoms. Examples of such compounds are 2,5-dimethoxyaniline; 2,5-diethoxyaniline; 2,5-dipropoxyaniline and 2,5-dibutoxyaniline.

The acylation of the 2,5-dialkoxyaniline is carried out with the anhydride of the acid, the radical of which is to be introduced on the amino nitrogen, and preferably while using, as the solvent, the acid corresponding to the anhydride. Generally, acylation is effected with acetic anhydride, the solvent being glacial acetic acid. The acetic anhydride is added to the solution of the dialkoxyaniline at a temperature ranging from about 30 to 35° C. After the addition, a rise in temperature occurs, usually to about 75 to 80° C.

The chlorination of the acylated product is one of the important features of my procedure. Chlorination is effected by means of hydrochloric acid, in the presence of a peroxide such as hydrogen peroxide, benzoyl peroxide, or the like. The temperature of chlorination is rather low, being from about 5 to 15° C. This mode of chlorination, in lieu of that involving chlorine, sodium chlorate or sodium hypochlorite, has the advantage that it yields a much purer product in higher yields.

The chlorinated product is salted out, isolated by filtration, and then hydrolyzed by heating in the presence of a dilute acid such as hydrochloric acid, sulfuric acid, phosphoric acid and the like.

The following examples will serve to illustrate the invention, although it is to be understood that the invention is not restricted thereto.

*Example 1*

229 parts of 2,5-dimethoxyaniline is added to 600 parts of glacial acetic acid, warmed to 30–35° C. and acetylated by the addition of 159 parts of acetic anhydride in one hour, during which time the temperature is allowed to rise to 75–80° C. After stirring at 75–80° C. for two hours to complete the acetylation, the reaction mixture is cooled to 10–15° C. and 1045 parts of 32% hydrochloric acid is added while keeping the temperature below 20° C. Cool to 8–10° C. and add in two hours at 8–12° C., 468 parts of a solution of hydrogen peroxide which contains 23.1% $H_2O_2$ by weight. Stir at 8–12° C. for five hours. Then, while keeping the reaction mixture at 8–12° C., add 3000 parts of 25% sodium chloride solution. Filter and wash the cake with cold water until the washings are pH 2.5–3.0. After drying, the yield of 2,5-dimethoxy-4-chloroacetanilid is 275–282 grams, which is 80–82.4% of theory.

92 parts of 2,5-dimethoxy-4-chloroacetanilid is added to 240 parts of methanol, 116 parts of 32% hydrochloric acid is added and the mixture heated to reflux. After one hour, 700 parts of water and 10 parts of decolorizing carbon are added and the reaction mixture cooled to 25° C. The mixture is filtered and the filtrate cooled to 10–15° C., neutralized at 10–15° C. to pH 6.4–6.6, and the precipitate collected and washed with cold water until it is free of chlorides. After drying, the yield of 4-chloro-2,5-dimethoxyaniline is 65-68.9 grams (85.2-87.5% of theory). The melting point is 114-117° C. Recrystallization from alcohol gives a melting point of 118° C.

*Example 2*

The procedure is the same as in Example 1, excepting that the 2,5-dimethoxyaniline is replaced by 2,5-diethoxyaniline.

The yield of the product compares to that of Example 1, and the same holds true with respect to the purity of the product.

Various modifications of the invention will be apparent to persons skilled in the art. I, therefore, do not intend to be limited to the patent granted except as necessitated by the prior art and appended claims.

I claim:

1. The process of producing 4-chloro-2,5-di-lower alkoxyanilines which comprises acylating a 2,5-di-lower alkoxy-aniline with an organic acid anhydride, chlorinating the acylated product with hydrochloric acid in the presence of a peroxide at a low temperature, and hydrolyzing the resulting 2,5-dialkoxy-4-chloro-acylanide.

2. The process as defined in claim 1, wherein the acylation is effected by means of acetic anhydride in a solution of acetic acid.

3. The process as defined in claim 1, wherein the peroxide is hydrogen peroxide.

4. The process of producing 4-chloro-2,5-di-lower alkoxyanilines which comprises reacting a 2,5-di-lower alkoxy-aniline with acetic anhydride in a solution of glacial acetic acid, at a temperature ranging from about 30 to 80° C., chlorinating the resulting acetylated product by means of hydrochloric acid, in the presence of hydrogen peroxide at a low temperature, and hydrolyzing the product thus obtained.

5. The process as defined in claim 4, wherein the hydrolysis is effected by means of dilute hydrochloric acid.

6. The process as defined in claim 4, wherein the 2,5-di-lower alkoxyaniline is 2,5-dimethoxyaniline.

7. The process as defined in claim 4 wherein the chlorination is effected at a temperature ranging from about 5 to 15° C.

8. The process of producing a 4-chloro-2,5-di-lower alkoxyacylanilide which comprises chlorinating a 2,5-di-lower alkoxyacylanilide with hydrochloric acid in the presence of a peroxide at a low temperature.

9. The process of producing 4-chloro-2,5-di-lower alkoxyacetanilides which comprises chlorinating a 2,5-di-lower alkoxyacetanilide with hydrochloric acid in the presence of a peroxide at a temperature ranging from about 5 to 15° C.

ALBERT BLOOM.

References Cited in the file of this patent

UNITED STATES PATENTS

| Number | Name | Date |
|---|---|---|
| 2,359,227 | Livak et al. | Sept. 26, 1944 |

OTHER REFERENCES

Karasch et al., C. A. vol. 39, p. 2966[7] (1945).